United States Patent [19]

Cole, Jr.

[11] Patent Number: 5,087,352
[45] Date of Patent: * Feb. 11, 1992

[54] DEVICE FOR CONTROLLING THE FLOW OF FOAM

[76] Inventor: Howard W. Cole, Jr., P.O.Box S, Burgin, Ky. 40310

[*] Notice: The portion of the term of this patent subsequent to May 16, 2006 has been disclaimed.

[21] Appl. No.: 661,401

[22] Filed: Feb. 26, 1991

Related U.S. Application Data

[60] Division of Ser. No. 287,457, Dec. 21, 1988, Pat. No. 5,019,244, which is a continuation-in-part of Ser. No. 123,569, Nov. 16, 1987, Pat. No. 4,830,737.

[51] Int. Cl.$^5$ ............................................. B03D 1/14
[52] U.S. Cl. ..................................... 209/170; 209/164; 209/168; 209/169; 222/56; 222/61; 222/309; 222/389; 417/390; 417/392; 417/472

[58] Field of Search ............... 209/164, 168, 169, 170; 222/56, 61, 309, 389; 417/390, 392, 472

[56] References Cited

U.S. PATENT DOCUMENTS

| | | | |
|---|---|---|---|
| 862,867 | 8/1907 | Eggleston | 417/390 |
| 4,498,318 | 2/1985 | Mitter | 222/56 |
| 4,830,737 | 5/1989 | Cole, Jr. | 209/170 |
| 5,019,244 | 5/1991 | Cole, Jr. | 209/164 |

Primary Examiner—Stanley S. Silvermasn
Assistant Examiner—Neil M. McCarthy
Attorney, Agent, or Firm—Middleton & Reutlinger

[57] ABSTRACT

A device for controlling the flow of foam which uses a piston-cylinder arrangement to receive foam at the rapid flow rate of a foam generator until the cylinder is substantially full of foam and then to dispense the foam at a lower flow rate by using the piston to gradually push the foam out of the cylinder.

4 Claims, 1 Drawing Sheet

DEVICE FOR CONTROLLING THE FLOW OF FOAM

This application is a divisional of U.S. patent application Ser. No. 07/287,457, filed Dec. 21, 1988, now U.S. Pat. No. 5,019,244; and U.S. patent application Ser. No. 07/287,457 is a continuation-in-part of U.S. patent application Ser. No. 07/123,569, filed Nov. 6, 1987, now U.S. Pat. No. 4,830,737.

BACKGROUND OF THE INVENTION

The present invention pertains to a device for controlling the production and flow of foam at low flow rates.

Small bubble foam generators are known, as described in my U.S. Pat. Nos. 3,811,660 and 4,400,220, which are hereby incorporated by reference. These generators produce foam with small bubble size at fairly high rates, which is useful for many applications, such as the use of foam for dust suppression. However, there are some applications in which my small bubble foam is needed at low flow rates.

In accordance with my U.S. Pat. No. 3,811,660, it is necessary to cause the air, water, and surfactant mixture to be subject to "substantial agitation" to produce small bubble foam. This process is performed by causing the mixture to flow at or above a minimum velocity through a pipe, hose or foamer (a unit having "tortuous passages"), or through a foamer as shown in my U.S. Pat. No. 4,207,202 which is hereby incorporated by reference.

Many applications for "small bubble" foam require very small flow rates of the foam. These rates may be less than 1/16 gallon per minute. The problem of producing very small flow rates of small bubble foam is two-fold. One is the requirement for metering such small quantities or air, water, and surfactant on a continuous basis, and the second is the requirement for providing "substantial agitation" through some foaming device.

A particular application in which small bubble foam is needed at low flow rates is called froth flotation. Froth flotation, or benefication as it is sometimes called, is a concentration process for separating the fine valuable minerals from their gangue impurities. To effect benefication, mineral-bearing ores are ground in water to form a mixture of mineral particles and non-mineral gangue particles. The resulting mixture (water, ore, mineral particles, and gangue particles) is conditioned with various chemicals including froth-producing compounds and agitated in flotation machines which introduce and disperse air in the form of bubbles throughout the pulp to liberate the mineral particles from the gangue particles. The bubbles collect at the surface of the pulp as a froth in which the valuable mineral particles are entrapped. The separated minerals are then either skimmed off or overflow with the froth to concentrate tanks, from which the minerals are then extracted for further processing.

There are many different flotation machines, but all require the formation of some type of air bubbles in the pulp. The size of the air pockets (bubbles) in the pulp is determined by many factors including the air pressure, hole size, agitation of the pulp, etc. In one type of machine, compressed air is introduced under or into the pulp by perforated pipes or by expelling the air through multihole plates or fine mesh screens.

It is desirable to have the air pockets as small as possible to more efficiently separate the valuable fine mineral particles from the non-mineral gangue particles. However, present commercial equipment cannot produce air pockets much less than 1/64 inch diameter (0.015"); rather, they normally produce much larger bubbles between 1/32 and 1/4 inch diameter.

I have found in my actual measurement that the small bubble foam produced by equipment constructed according to my U.S. Pat. Nos. 3,811,660 and 4,400,220 have bubbles from 50 to 200 micron diameter (0.05 to 0.2 mm) (0.002–0.008 inches) when first ejected from the foam generator. These bubbles exist in a matrix consisting of water and surfactant in the form of highly stressed films surrounding small pockets of air. When this foam is introduced into a tank containing a pulp consisting of ground ore containing fine mineral and non-mineral (gangue) particles, the water film of the mass of bubbles disperses into the water of the pulp, leaving each bubble as a pocket of air surrounded by water. This results in a mass of air pockets which forms a froth which is very effective in entrapping the mineral particles. Thus, by using my small bubble foam the efficiency of the flotation machines is greatly improved.

The density (weight per unit volume) of the water into which the very small air pockets are introduced varies with the number of air pockets per unit volume of water. Therefore, it is necessary to accurately control the amount of air in the form of small air pockets introduced into the flotation machines.

SUMMARY OF THE INVENTION

The present invention provides a device for supplying small bubble foam at low flow rates and a method for enhancing the benefication of minerals using small bubble foam.

The device includes a piston-cylinder arrangement, foam supply means in flow communication with one end of the cylinder and operable in response to the movement of the piston, and fluid supply means in flow communication with the other end of the cylinder and operable in response to movement of the piston. The operation of this device is such as to permit the foam generator to operate at its normal output rate for short intervals, filling up the lower chamber 9 of the cylinder 10, and then to discharge the foam from the chamber 9 at a lower flow rate, consistent with the needs of the process.

When the device is used for the benefication of minerals, the output from the lower chamber 9 is put into the bottom of the tank to form the froth for entrapping the mineral particles.

BRIEF DESCRIPTION OF THE DRAWING

A better understanding of the present invention will be had upon reference to the following description in conjunction with the accompanying drawing wherein.

DETAILED DESCRIPTION OF THE INVENTION

Figure 1:
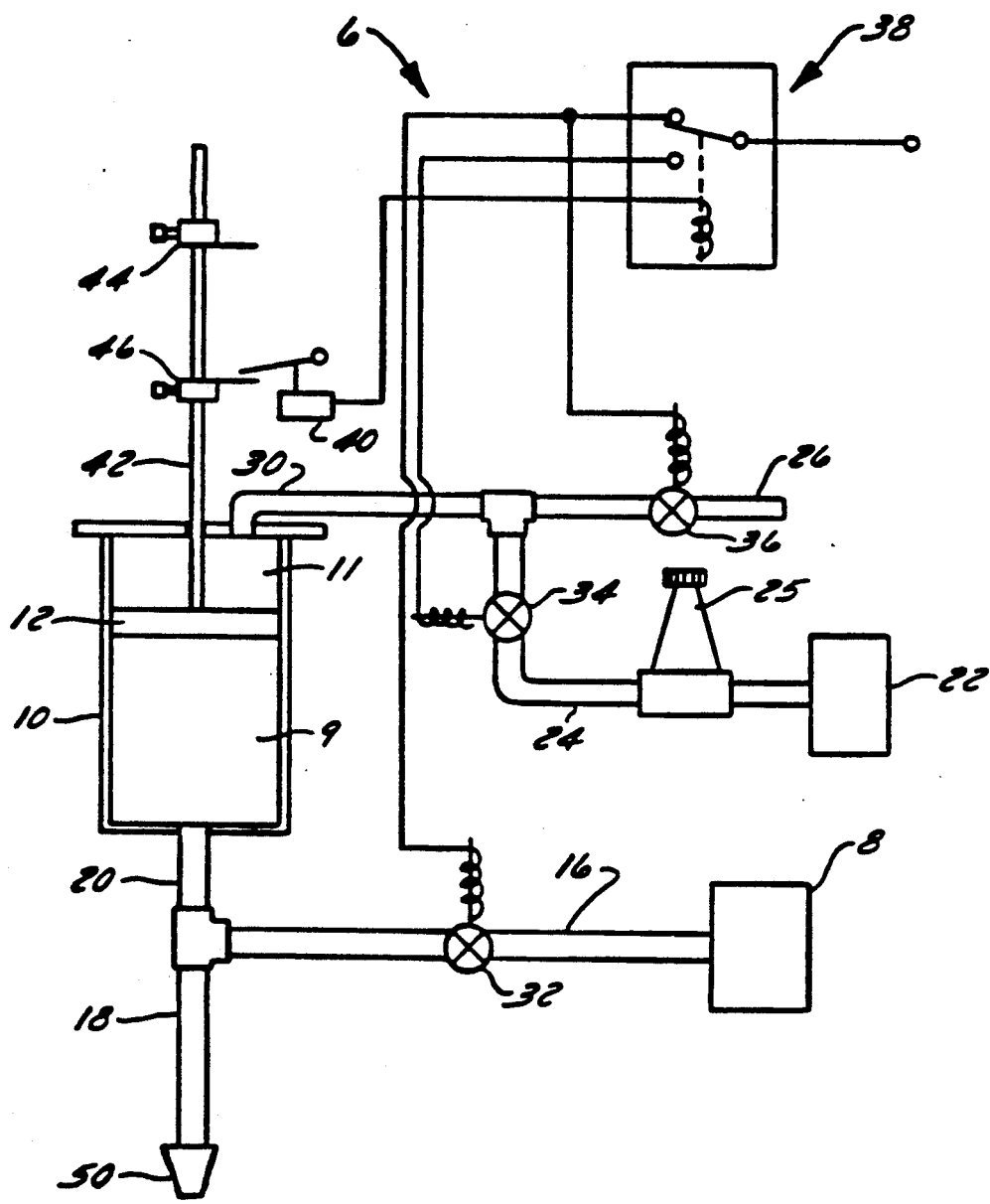
FIG. 1 is a schematic representation of an apparatus of the present invention for controlling the flow rate of foam.

The apparatus shown in FIG. 1 of the drawings provides for a conventionally sized foam generator 8 as described in my U.S. Pat. Nos. 3,811,660, 4,400,220, or 4,207,202 to operate at a normal discharge rate for only short periods of time. Essentially the foam generator fills the lower portion 9 of the cylinder 10 below the piston 12 with small bubble foam under pressure, then shuts off until an externally supplied source of air pressure pushes the piston 12 downward, forcing the small bubble foam out of the cylinder 10 to a downstream operation (not shown) which utilizes the small bubble foam. One preferred use of the apparatus is in a froth flotation or mineral benefication operation, where the foam consists of water, a selected surfactant and air to produce foam bubbles from 50 to 200 microns in diameter. The discharge rate from the cylinder 10 is controlled by the external air pressure applied to the top portion 11 of the cylinder 10.

An apparatus 6 for controlling the flow of foam from a foam generator 8 to a downstream operation is shown in FIG. 1 as including the cylinder 10 and piston 12. The lower portion 9 of the cylinder 10 serves as an expandable container for receiving the foam and is in flow communication with the foam generator 8 by a foam inlet line 16. The lower portion 9 of the cylinder 10 is in flow communication with, for example, a downstream operation by a foam outlet line 18. The foam outlet 18 may include a nozzle 50 as shown to provide some back pressure on the line 18, or the length of the line 18 may itself provide enough back pressure to overcome any inertial and frictional forces in the piston and cylinder. If the foam outlet line 18 is placed at the bottom of a tank for the benefication of minerals, no nozzle is used, because the head of the fluid in the tank provides the back pressure. The foam outlet line 18 and foam inlet line 16 join with a common foam conduit 20 which opens into the lower chamber 9 of the cylinder 10. A source of pressurized gas, preferably pressurized air 22 is in gas flow communication with the upper chamber 11 of the cylinder 10 through an air inlet line 24. A fluid (air) regulator 25 can be positioned in the air inlet line 24. The setting of the air regulator 25 may be used as a means to control the discharge rate of the foam into a froth flotation or mineral benefication process. The upper chamber 11 is also in controlled flow communication with, for example, the ambient environment through an air discharge line 26. The air inlet line 24 and air exhaust line 26 join with a common air conduit 30 which opens into the upper chamber 11.

A first solenoid valve 32 is located in the foam inlet line 16 to control the flow of foam therethrough from the foam generator 8 to the lower chamber 9 of the cylinder 10. A second solenoid valve 34 is located in the air inlet line 24 to control the flow of air therethrough from the air source 22 to the upper chamber 11. A third solenoid valve 36 is located in the air discharge line 26 to control the flow of air being exhausted therethrough from the upper chamber 11. The first, second, and third solenoid valves are each operatively connected to an electrical relay 38. The functioning of the relay 38 is in turn controlled by a two position switch 40. The two position switch 40 is operated between its two positions by a control rod 42 affixed to the piston 12 and extending through a sealed opening in the top end of the cylinder 10 adjacent to the two position switch 40. Two adjustable switch operators 44 and 46 are attached to the control rod 42 outside of the housing 12 and project from the rod 42 in spaced apart relationship. The arms 44, 46 move with the rod 42 as the piston 12 moves up and down. This process is controlled by the movement back and forth of the piston 12 which moves the control rod 42 with the two adjustable switch operators 44 and 46 in a longitudinal direction of the control rod 42 back and forth past the two way switch 40.

In the lower position of the rod 42 corresponding to the lowermost position of the piston 12 which occurs when the foam is expelled from the lower chamber 9, the switch operator 44 has opened the two position switch 40, de-energizing the relay 38. In this condition the first solenoid valve 32 in the input foam line 16 and the third solenoid valve 36 in the air discharge line 26 are both energized to an open position and the second solenoid valve or air supply valve 34 is de-energized to a closed position. This allows the Foam Generator 8 to operate at its normal discharge rate to fill the lower chamber 9 with foam through the foam inlet line 16 and common conduit 20. As the lower chamber 9 fills with foam, the piston 12 moves upward, and the air in the upper chamber 11 is expelled through the air discharge line 26 past the open third solenoid valve 36 to atmosphere.

As the lower chamber 9 is filled with foam, the piston is thereby pushed upward, expanding the chamber 9. When the piston 12 reaches its upper position, the switch operator 46 on the control rod 42 shifts the two position switch 40 to the closed position to energize the relay 38; the first and third solenoid valves 32 and 36 (which were energized) are de-energized to closed positions, and the second solenoid valve 34 in the air inlet line 24 is energized to an opened position. This allows air to enter the upper chamber 11 through the air inlet line 24, and the pressure of the air in the upper chamber 11 acts on the piston 12, pushing it downward and forcing the foam out of the lower chamber 9 through the common conduit 20 and foam outlet line 18, thus completing the cycle. The amount of foam to achieve optimal benefication varies according to many factors, including the type of mineral being separated, the specific gravity of the pulp, the density of the gangue, etc., such that the amount of foam required will usually be left to the empirical judgment of the operator to obtain the desired results.

The foregoing detailed description is given primarily for clearness of understanding and no unnecessary limitations are to be understood therefrom, for modification will become obvious to those skilled in the art upon reading this disclosure, and may be made without departing from the spirit of the invention and scope of the appended claims.

What is claimed is:

1. An apparatus for providing foam at a slow rate, comprising:

a piston;

a cylinder which surrounds said piston and defines and upper cylinder chamber at one end of the piston and a lower cylinder chamber at the other end of the piston;

a foam generator in controlled fluid communication with the interior of said lower cylinder chamber;

a pressurized gas source in controlled fluid communication with the interior of said upper cylinder chamber;

and control means for sensing the upward and downward movement of said piston, for controlling the flow communication of said foam generator with the interior of said lower cylinder chamber in response to said sensing and for controlling the communication of said pressurized gas source with the interior of said upper cylinder chamber in response to said sensing;

said control means functioning by sensing the upward movement of said piston to a first position and closing said fluid communication with said foam generator and opening said fluid communication with said pressurized gas source, causing said piston to move downwardly and expel foam; and said control means further functioning by sensing the downward movement of said piston to a second position and closing fluid communication with said pressurized gas source and opening fluid communication with said foam generator, thereby causing said lower cylinder chamber to fill with foam and said piston to move upwardly.

2. The apparatus of claim 1, wherein said control means comprises:
 a pair of switch operators mounted onto and spaced at preselected positions along an elongated rod connected to said piston;
 a two-position switch operable in response to the movement of said switch operators; and
 a relay activated in response to said two-position switch and adapted to activate a plurality of valves for controlling the flow communication of said foam into the interior of said lower cylinder chamber and for controlling the flow communication of said pressurized gas source into the interior of said upper cylinder chamber.

3. The apparatus recited in claim 1 wherein said foam generator is constructed so as to provide small bubble foam having an average bubble size less than about 0.015 inches in diameter.

4. The apparatus recited in claim 1 wherein said foam generator is constructed so as to provide small bubble foam having a bubble size from between about 0.002 to 0.008 inches in diameter.

* * * * *